Aug. 15, 1950     P. KRUSE     2,518,910
MACHINE FOR SEAMING ENDS ON RECTANGULAR
AND IRREGULARLY SHAPED CAN-BODIES
Filed Feb. 3, 1949     7 Sheets-Sheet 5

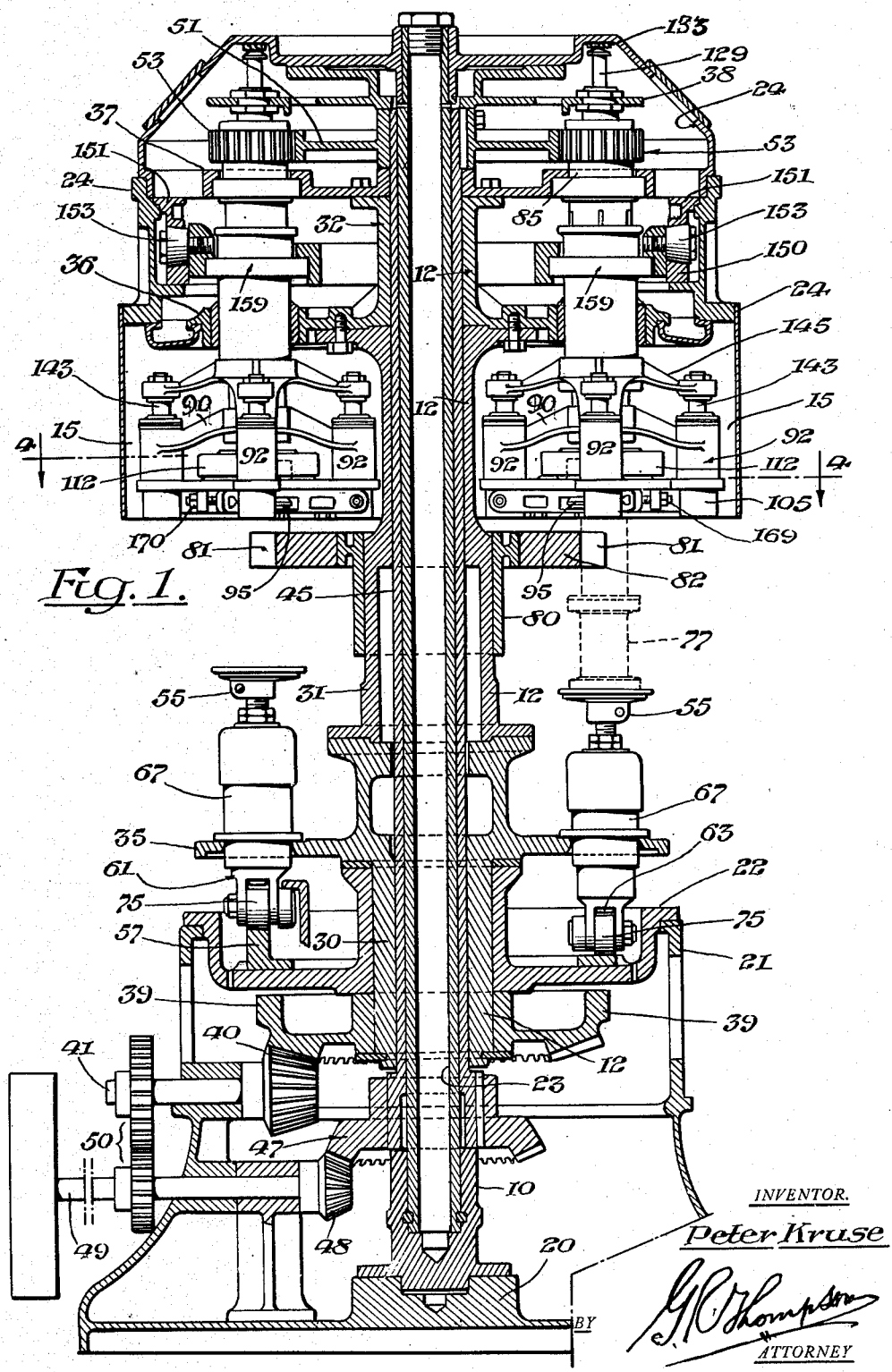

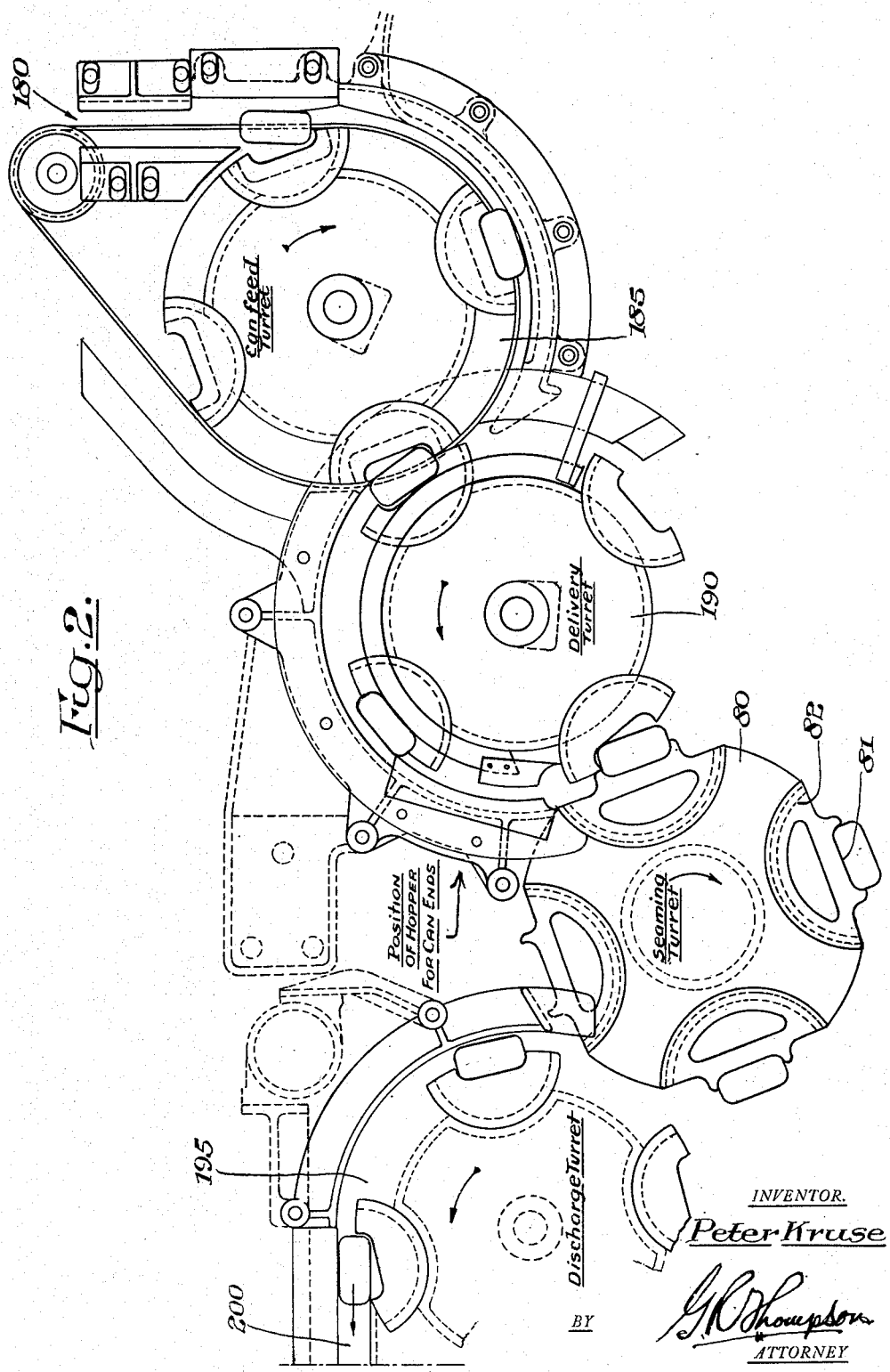

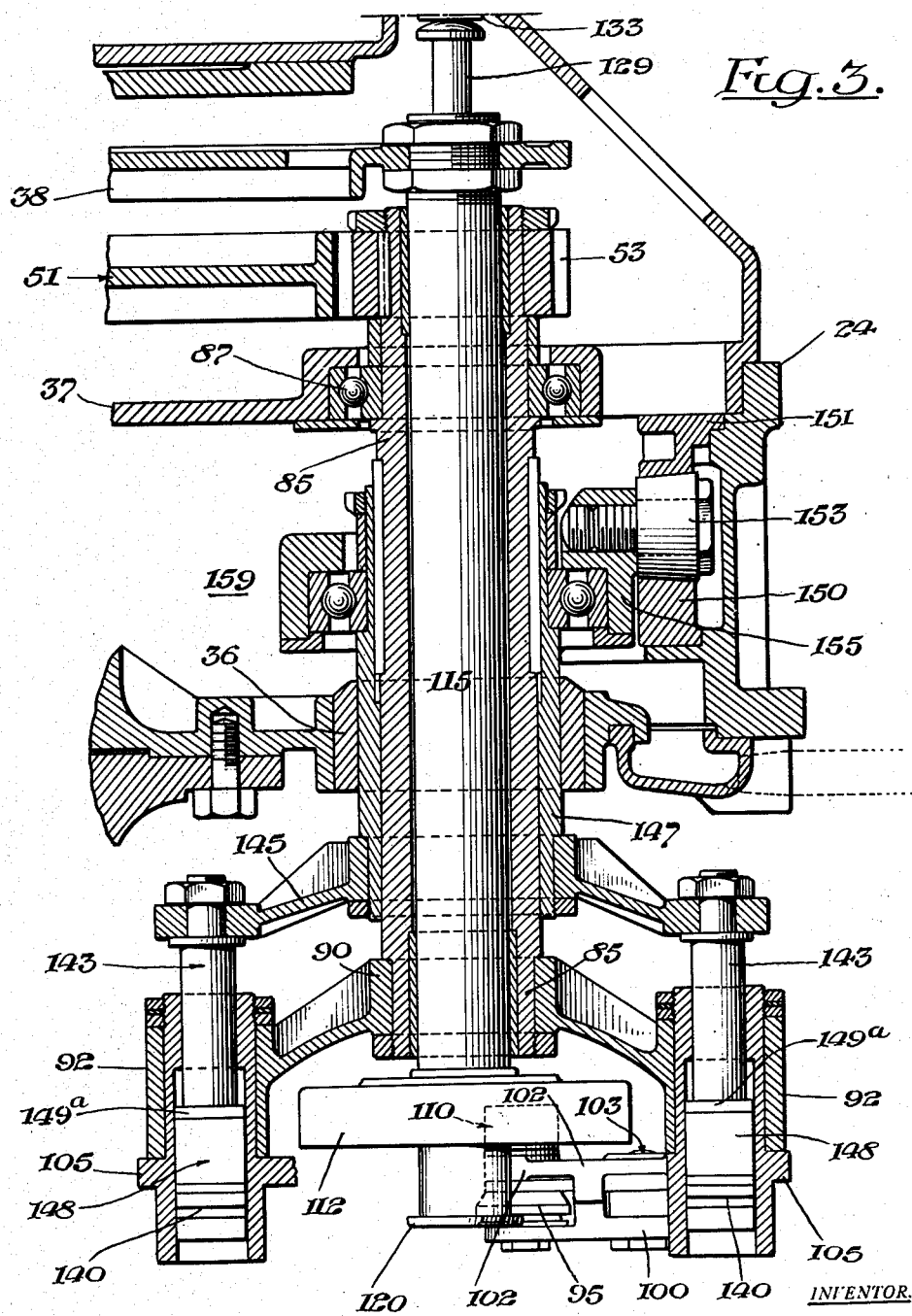

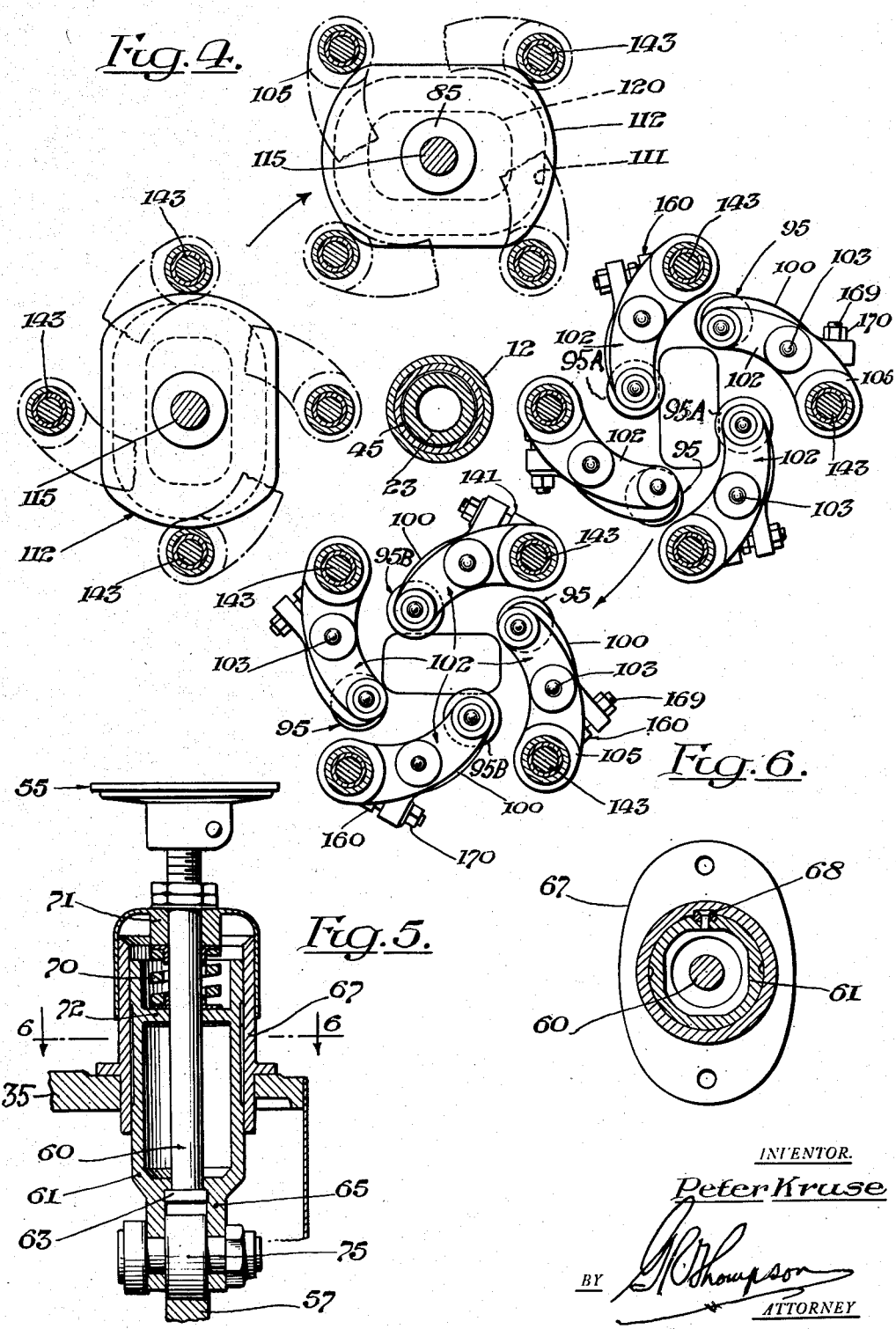

INVENTOR.
Peter Kruse
BY
ATTORNEY

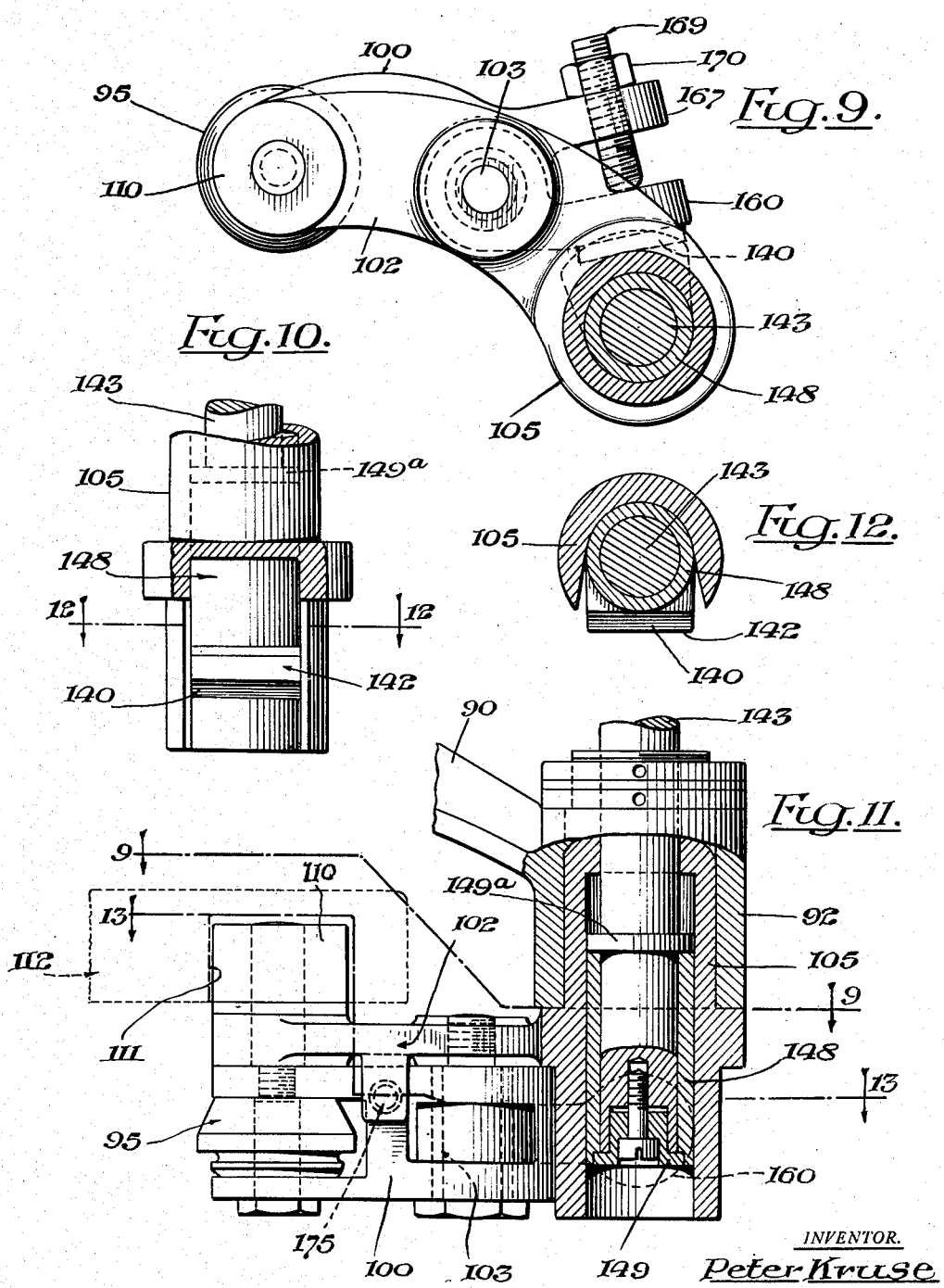

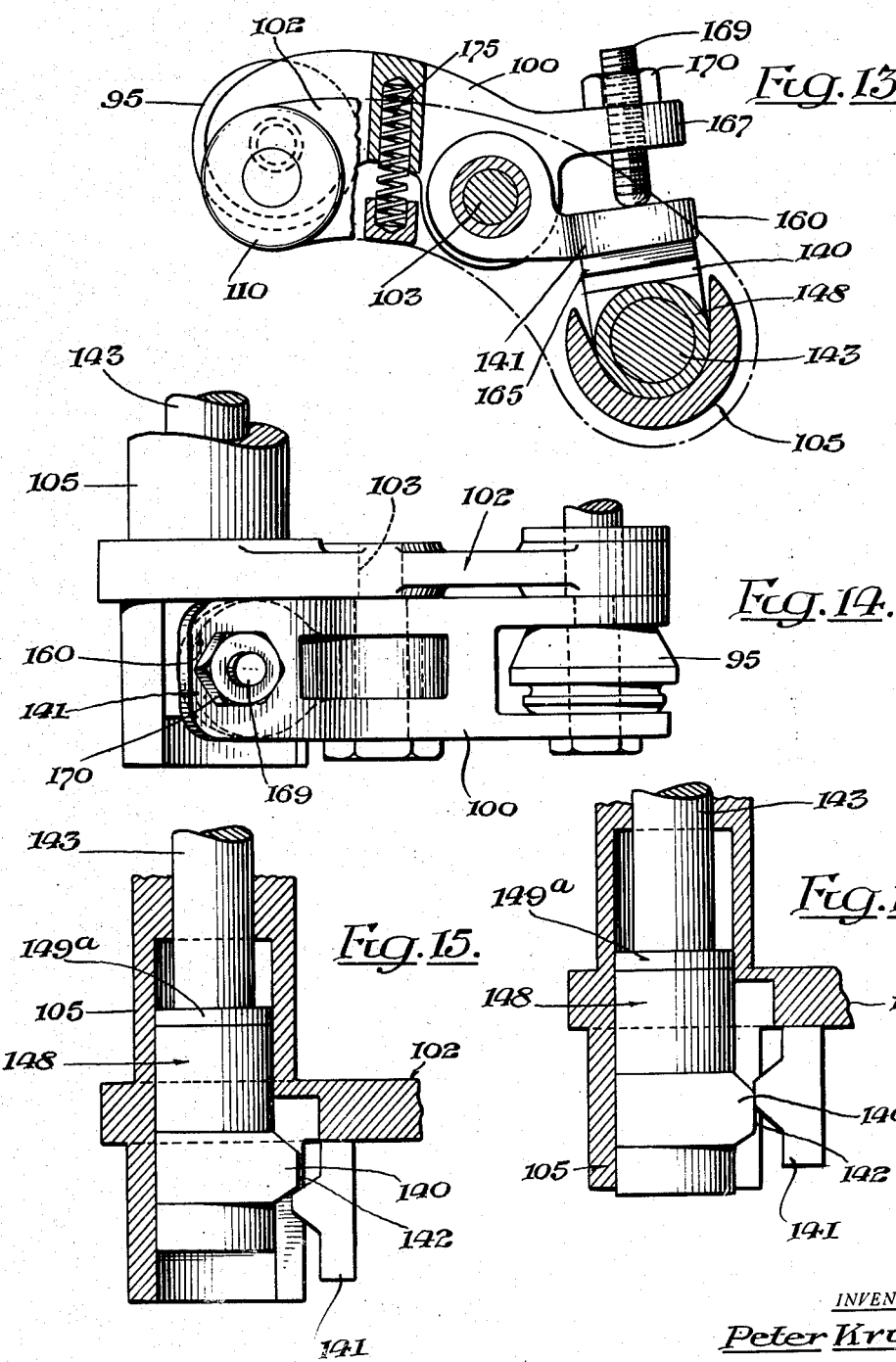

Patented Aug. 15, 1950

2,518,910

UNITED STATES PATENT OFFICE 2,518,910

MACHINE FOR SEAMING ENDS ON RECTANGULAR AND IRREGULARLY SHAPED CAN BODIES

Peter Kruse, Brooklyn, N. Y.

Application February 3, 1949, Serial No. 74,364

4 Claims. (Cl. 113—24)

This invention relates to seaming machines of the type known as "square can seamers" for seaming the "ends" on rectangular and irregularly shaped cans, and provides improvements therein.

The output of square can seamers is low as compared with the output of a body-maker. In practice, seaming machines have been speeded up to a point where they are noisy, strain the mechanism, and require frequent overhauling.

The present invention provides a multiple head seamer, with a large output, in which the seaming heads run relatively slowly, which stands up in factory and packing-house operation, and which will give service for long periods without requiring repairs or rebuilding.

The invention further provides a novel and effective seaming head in which the cans do not rotate when the ends are being seamed onto the can-bodies, and in which the pressure of the seaming rolls on the metal in the seam may be readily adjusted to effect a tight seam and yet not crack the metal because of excessive pressure thereon.

An embodiment of the invention is illustrated in the accompanying drawings. The invention, within the scope of the claims and equivalents, may receive other embodiments than that herein specifically illustrated and described.

Referring to said drawings:

Figure 1 is a vertical sectional view of the machine.

Figure 2 is a plan view of a means for feeding bodies and ends to the seamer, the first turret (from right to left) taking can-bodies, at properly spaced intervals, from a conveyor. At the second turret "ends" are fed from a hopper (not shown) onto each can-body. The third turret is the seaming machine turret, and the fourth turret is for removing can-bodies with "ends" seamed thereon from the seaming machine.

Figure 3 is an enlarged vertical sectional view of one of the seaming heads shown in Fig. 1.

Figure 4 is a view of the seaming heads of a four-head machine, the seaming rolls of two of the heads being shown, and the guides and chucks of two other seaming heads being shown.

Figure 5 is a vertical sectional view of one of the pads, which lift can-bodies and hold them against the chuck while the seaming rolls act to seam "ends" thereon.

Figure 6 is a transverse section of line 6—6 of Fig. 5.

Figure 9 is a top plan view of one of the arms which carries a seaming roll.

Figure 10 is a view of the hub of the seaming-roll arm shown in Fig. 9, with a view of a cam and cam-slide which works therein.

Figure 11 is a side view of a seaming-roll arm, with the hub in vertical section.

Figure 12 is a cross-sectional view of line 12—12, Fig. 10.

Figure 13 is a sectional view on the line 13—13, Fig. 11.

Figure 14 is a side view of a seaming-roll arm viewed from the side opposite that shown in Figure 11.

Figures 15 and 16 are vertical sectional views of a seaming roll arm at the hub and showing respectively the cam and cam-slide in a position in which a seaming roll is not pressed into seaming position, and in which it is pressed into seaming position by the cam.

Figure 7:
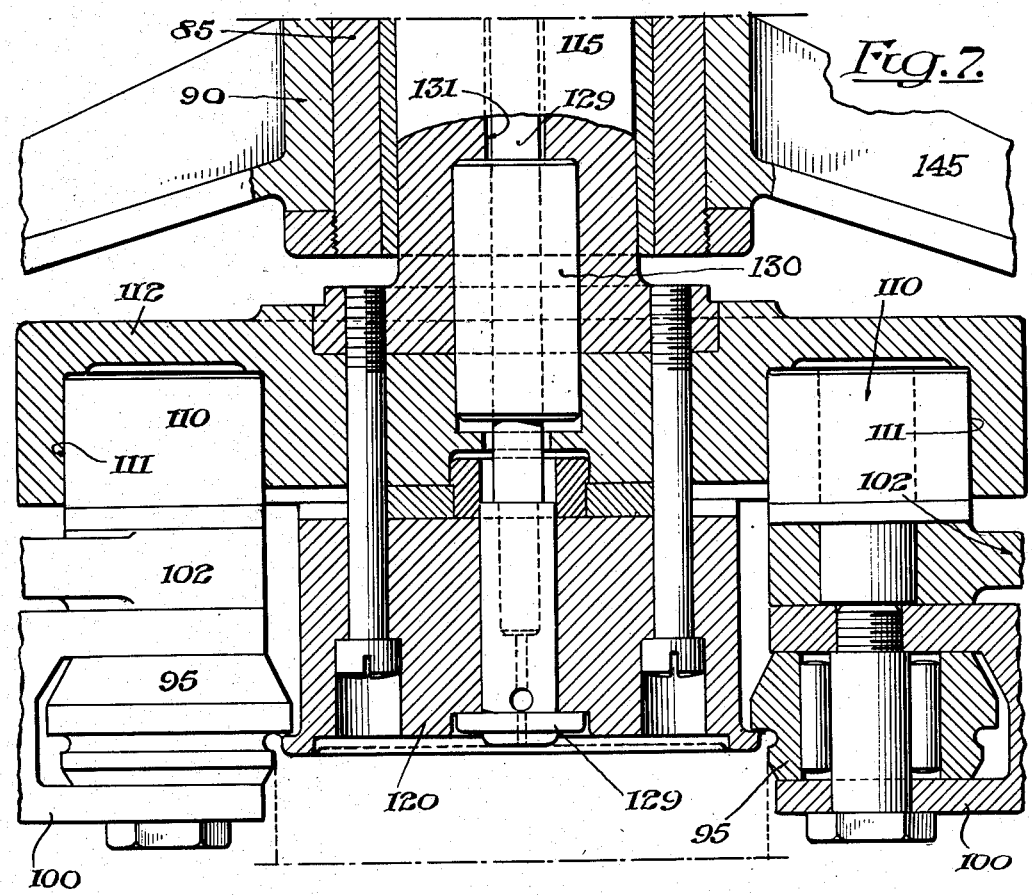
Figure 7 is an enlarged vertical sectional view of parts of one of the seaming heads.
Figure 8:
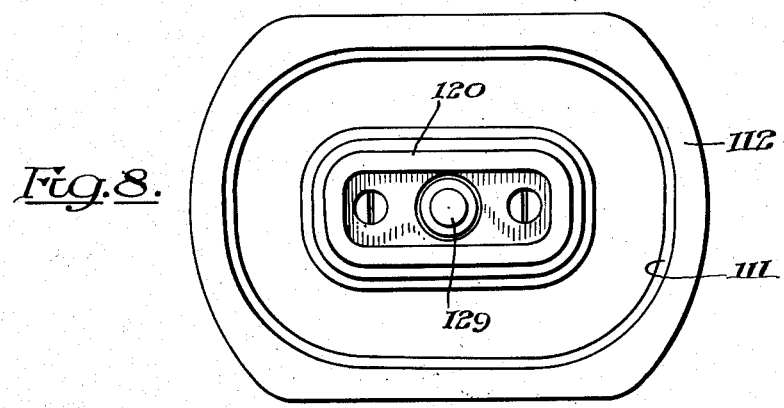
Figure 8 is a plan view, looking upward, of a chuck and guide for the arm on which a seaming roll is carried.

Referring to said drawing, numeral 10 designates a stationary frame, numeral 12 a rotating frame and numeral 15 the seaming heads.

The stationary frame 10 comprises the base 20, base housing 21, the base top or plate 22, the hollow post 23, and the canopy 24.

The rotating frame 12 comprises the sleeves 30, 31 and 32, coaxial with the post 23. Brackets 35, 36 and 37 are attached to or form a part of the sleeves 30, 31 and 32. Bracket 38 (through which rods 129 project) turns with brackets 35, 36 and 37. The rotating frame 12 is rotated in suitable manner by beveled gear 39 and pinion 40 on a shaft 41.

Coaxial with the post 23 is a sleeve 45 which is rotated through a beveled gear 47, pinion 48 and drive shaft 49. Shaft 41 is driven from shaft 49 through a pair of spur gears 50. The sleeve 45 drives the seaming heads 15 through gear 51 fastened to sleeve 45, and pinions 53, one for each seaming head.

The machine comprises a plurality of seaming heads 15, four being shown.

Assembled can-bodies and "ends" are fed to the seaming machine in any suitable manner, usually mechanically, as by a feeding mechanism, such for example as that partially illustrated in Fig. 2. The feeding mechanism, however, is adjunctive and no claim thereto is made in this application.

Carried by the brackets 35 of the rotating frame 12 are pads 55, one below each seaming head 15. The pads are raised and lowered by means of a ring cam 57 fastened on the plate 22 fixed to the housing 21 and forming a part of the stationary frame 10. The pads 55 each comprises a post 60 which has a limited axial sliding movement in a sleeve 61. The post 60 is held against rotation by a square head 63 fitting in a groove constituted by the forked end 65 of the sleeve 61. The sleeve 61 has axial movement in a bearing 67 fixed on the bracket 35, and is held against rotation in the sleeve-bearing 67 by suitable means, such as a pin or key 68, Fig. 6. A compression spring 70 reacts between a shoulder 71 on post 60 and a shoulder 72 on sleeve 61. The head 63 on post 60 limits the separating movement of the post 60 and the sleeve 61 under the action of the spring 70. A roller 75 mounted in the forked end 65 of the sleeve 61 rides on the cam 57.

An assembled can-body and end is placed on each pad 55, or delivered thereto by the feeding mechanism illustrated in Fig. 2. Provision for handling can-bodies of different height is made, and one way of doing this is to mount filler-blocks 77, Fig. 1, of different height conforming to the height of the can-body, on the pads 55.

Associated with the pads is a turret 80, Fig. 1, having recesses 81 which serve to position can-bodies on the pads 55 in geometrical symmetry with the chucks on the seaming heads 15, hereafter described. The turret 80 is fixed on the rotating frame 12. The turret 80 is usually provided with replaceable inserts 82. Different inserts carry recesses 81 of sizes and shapes conforming to various sizes and shapes of can-bodies.

Each of the seaming heads 15 has a rotary shaft 85, Fig. 3, in the form of a sleeve which has a bearing on the bracket 37 which forms part of the rotary frame 12. The shaft 85 is rotated from drive shaft 49 through pinion 48, gear 47, sleeve 45, gear 51 and pinion 53 fastened on said shaft 85. Shaft 85 has an indirect bearing on bracket 36 through a sleeve 147 hereinafter described.

Fixed upon the rotary shaft 85 is a bracket 90 having bearings 92 thereon for four arms which carry two sets of seaming rolls 95.

Each of the seaming rolls 95 is rotatably mounted on a secondary arm 100 which is pivoted upon a primary arm 102, as indicated at 103, Figs. 4, 9, 11, 13 and 14. The primary arm 102 has a hub 105 which is pivotally mounted in one of the bearings 92 of the bracket 90, Fig. 3.

The primary arm 102 has thereon a pin or roller 110 which projects into a cam groove 111 in a guide or cam plate 112 which is fastened to a non-rotary post 115 fastened to the bracket 38 forming a part of the movable frame 12, as hereinbefore described. The non-rotary post 115 extends through the rotary sleeve 85.

The cam groove 111 conforms to the shape of the can to be seamed.

Fastened also to the non-rotary post 115 is a chuck 120, Figs. 3 and 7, against which the assembled can-bodies and ends are held during the seaming operation. The shape of the chuck 120 corresponds to the shape of the cam groove 111 in the block 112, and the function of the cam groove 111, roller 110 and primary arm 102 is to guide the seaming rolls 95 in a path around the chuck 120, conforming to the shape of the chuck and also to the shape of the assembled can-bodies and ends which are held against the chuck by the pads 55, and against the edges of which assembled can-bodies and ends the seaming rolls 95 act to form the seam.

Numeral 129 designates a knock-out bar which extends through an axial bore 131 in the post 115, Fig. 7. This knock-out bar serves to push cans away from the chuck after the seaming has been completed, and is pushed downward against the pressure of a spring (not shown) at proper times by a ring cam 133, Fig. 3, fixed on the canopy 24 which forms a part of the fixed frame 10. The knock-out bar 129 extends through a dowel-pin 130 which centers the guide block 112 on post 115.

The pressure of the seaming rolls 95 against the edges of the assembled can-bodies and ends held against the chuck 120 is effected by cams 140 which make contact with the heels 141 of the secondary arms 100 which carry the seaming rolls 95, as best shown in Figs. 13 to 16 inclusive. The cams 140 advantageously are formed with broad contacting surfaces, with a "flat" 142 at the summit for distributing the load transmitted to the heels 141 of secondary arms 100, and thereby having good resistance to wear. The cams 140 are mounted on rods 143 which are slidably mounted in the hubs 105 of the primary arms 102, and which hubs 105, as heretofore described, are pivotally mounted in the bearings 92 of bracket 90 fastened to the rotary shaft 85. The slide rods 143 are each fastened to an arm of a spider 145, Fig. 3, which spider is fastened to a sleeve 147 coaxial with the rotary shaft 85, and turns therewith. The sleeve 147 has bearing on the bracket 36 of the moving frame 12. The cams 140 have a limited movement around the axes of rods 143 so that the cams 140 may adjust themselves around the axis of the rods 143 in contact with the heels 141 of the secondary arms 100, when the secondary arms turn on pivots 103, and the primary arms 102 pivot in the bearings 92 under the influence of the cam groove 111 and roller 110. To this end the cams 140 are advantageously formed on sleeves 148, Fig. 11, which sleeves are swivelled on rods 143 between collars 149, 149A, on rods 143.

The slide rods 143 carrying the cams 140 are slid up and down axially, through the spider 145 and sleeve 147, by circular cams 150, 151, Figs. 3 and 1, fixed upon the canopy 24 forming a part of the stationary frame 10 and a pin or roller 153 carried by a ring 155 in which the sleeve 147 turns. As is here shown, the ring 155 is the outer ring of a ball bearing 159 and the roller 153 is fixed to the outer ring (155) of the ball bearing.

The heels 141 of the secondary arms 100, each of which arms carries a seaming roll 95, are preferably formed as a separate part 160, as shown best in Figs. 9, 13 and 14. The part 160 is in the form of a plate which is pivoted to the secondary arm 100 as indicated at 103, the pivot pin being conveniently the same pivot pin on which the secondary arm 100 is pivoted to the primary arm 102. The plate 160 may have a broad nose 165 which makes contact with the cam 140. The secondary arm 100 carries a part 167 which projects over the plate 160, and a screw 169 threaded into the part 167 bears against the back of plate 160. By threading the screw 169 in or out, more or less toward and from the plate 160, the proximity of the nose 165 on pivoted plate 160 to the cam 140 may be adjusted. Numeral 170 designates a nut which may be used to lock the screw 169 in adjusted position. By the adjustment effected by the screw 169, the pressure of the seaming rolls 95 against the edges of the assembled can-bodies and ends held in the chuck 120 may be adjusted. A spring 175 (Fig. 13) reacting between the primary arm 102 and the secondary arm 100, acts to normally press the heel 141 of the secondary arm (nose 165 of plate 160) into the path of movement of the cam 140.

*Operation*

The rotary frame 12 is rotated around the post 23 of the stationary frame 10 by shaft 41 and gears 39 and 40. The seaming heads 15 (four in the example illustrated) being mounted on the rotary frame 12 revolve around the axis of the post 23. The seaming heads 15 also rotate as they revolve, rotation thereof being effected by the drive shaft 49, gears 47 and 48, sleeve 45, gears 51 and 53 and sleeve 85, Figs. 1 and 3. Within the seaming heads, the guides 112 and chucks 120 revolve with the seaming heads, but do not rotate, being supported by the post 115 attached to the bracket 38 of the rotating frame 12.

The locating turret 80 and pads 55, being attached to the rotating frame 12 revolve around the axis of the post 23, the pads 55 being located under each of the chucks 120, and the recesses 81 in the locating turret 80 being arranged symmetrically with relation to the geometrical shape of the chucks 120.

Assembled can-bodies and ends are placed upon the pads 55, or fed thereto by any suitable mechanism, one form of which is illustrated to the extent necessary to show the function thereof, in Fig. 2.

The functional operation of the feed mechanism illustrated in Fig. 2, or in any other suitable feed mechanism, is to take flanged can-bodies from a conveyor 180, separate them by a recessed turn table 185 at a distance corresponding to the distance apart of each of the seaming heads 15, deliver these to another recessed turn table 190 whereat can ends are dropped on to can bodies from a suitable "end" hopper (not shown). The assembled can-bodies and ends are then delivered to the recesses 81 of the locating turret 80 of the seaming machine.

After the ends have been seamed on the can-bodies, they may be removed from the machine by a turn table 195 and a delivery belt 200.

When the assembled can-bodies and ends are placed upon the pads 55 the recesses 81 of locating turret 80 locate them on the pads in geometrical symmetry with the chucks 120 of each seaming head 15. Being thus properly positioned on the pads 55, the ring cam 57 acting on the rollers 76, sleeve 61 and post 60, Fig. 3, elevates the pads to press the assembled can-bodies and ends thereon against the chucks 120 of the seaming heads 15. The spring 70 interposed between the sleeve 61 and the post 60 provides for some resilience in the pressure of the assembled can-bodies and ends against the chucks by the pads 55, and aids in preventing cracking of the metal in the seam.

With the can-bodies and ends pressed against the chuck the seaming rolls 95 of the seaming heads are brought into action to produce the seam. As previously stated, the seaming heads 15 are rotating as they revolve. Ring cams 150, 151, Figs. 1 and 3, on the canopy 24 forming a part of the fixed frame 10, acting through the roller 153, ring 155, sleeve 147 and spider 145 move the slide rods 143 downwardly while revolving with the seaming heads. Two of the cams 140 are mounted axially in advance of the other two cams 140 carried by the two other slide rods 143 of the same seaming head. The two first acting cams 140 contact the heels 141 of the two secondary arms 100 on which the first set of seaming rolls 95A, 95A are mounted. The pressure of the first acting cams 140 against the heels of the secondary arms carrying the first set of seaming rolls 95A, 95A presses the said first seaming rolls into contact with the edges of the can ends and the flanges on the can bodies lying beneath. The action of the first set of seaming rolls 95A, 95A is to curl the edges of the can ends and the flanged edges of the can-body together against the can-body. The curling of the edges of the ends and can-bodies together may be effected in about 2 or 3 rotations of the seaming head. When the edges of the ends and can-bodies have been curled together, the aforesaid ring cams 150, 151 act through the roller 153, ring 155, sleeve 147 and spider 145 to give the slide rods 143 a further downward movement, which brings the second set of cams 140 against the heels 141 of the secondary arms 100 on which the second set of seaming rolls 95B, 95B are carried. The seaming rolls 95B, 95B are thereupon pressed against the curled edges of the can-body and end held against the chuck 120 and press the curled metal of the end and can-body tightly against the chuck, thereby effecting a tight seam. The pressure of the seaming rolls 95B, 95B may be regulated by the screw 169, the screw being advanced toward the pivoted part 160 on the heel of the secondary arm 100 to increase the pressure of the seaming rolls 95B, 95B, and backed away from part 160 to decrease the pressure. The pressure of the seaming rolls 95B, 95B should be regulated to an amount which will not crack the metal in the seam. Screws 169 may also be provided on the heels of the secondary arms 100 which carry the first set of seaming rolls 95A, 95A for adjusting the pressure and action of this set.

The seaming rolls 95 in their revolutions around the assembled can-bodies and ends, are caused to follow a path symmetrical with the shape of the can-bodies. This is effected by the pins or rollers 111 carried by the primary arms 102 which follow the contour of the guide channel 111 in the guide 112. The guide channel 111, symmetrical with the shape of the can-body to have an end seamed thereon, causes the primary arms 102 to move toward and from the axis on which the seaming head turns, and the primary arms impart the same movement to the secondary arms which carry the seaming rolls 95.

The ring cams 150, 151 may act to move the cams 140 out of contact with the heels of the secondary arms 100 which carry the first set of seaming rolls 95A, 95A, or they may remain in contact, during the time that the cams 140 are in contact with the heels 141 of the secondary arms 100 on which the second set of seaming rolls 95B, 95B are mounted.

Both sets of seaming rolls 95A and 95B complete their action between the time that an assembled can-body and end is placed upon a pad 55 and discharged therefrom, in less than a full rotation of the rotating frame 12.

After the second set of seaming rolls 95B, 95B have completed their seaming action, the cams 150, 151 act on the slide rods 143 to lift the cams 140 out of contact with the heels 141 of the secondary arms 100 which carry all of the seaming rolls of one head. Springs 175 then swing the seaming rolls 95 away from the chuck 120; the timing is such that the seaming rolls 95 are moved away from the chuck 120 before the position for discharge of the seamed cans is reached.

The swiveling of the cams 140 on the slide rods 143 enables the cams to maintain a steady and broad contact against the heels 141 of arms 100 during the pivotal movements of arms 102 under the influence of the roller 110 and groove 111 in guide block 110 and during the independent pivotal movements of arms 100 under the influence of the cams 140.

As the discharge position for the seamed cans is closely approached, the knock out bar 129 is brought into action. At the knock-out position the bar 129 moves onto a rise on the cam ring 125 which forces the knock-out bar downwardly against the top of the end seamed on the can body, and forces it away from the chuck 120. At the same time that the knock-out bar 129 is acting, the ring cam 57 is acting to lower the pad 55. The seamed can is lowered by the pad 55 sufficiently to clear the seaming head 15, and in this position is delivered to the turn table 195 of the delivery mechanism, or otherwise removed from the pad 55.

By substituting guides 112, chucks 120 and recessed inserts 82 in locating turret 80, the machine may be adapted for various shapes and sizes of cans. Moreover, by substituting filler blocks 77, the machine may be adapted for various heights of cans.

The present seaming machine has a high output without imposing severe strains on any part of the mechanism. The present machine is designed for an output of 150 cans per minute, and by reason of the machine having four seaming heads in place of one, the seaming heads are rotated at a speed of 37½ rotations per minute, which speed of rotation is very low compared to that of similar purpose machines, and imposes no detrimental strains on the mechanism. The machine is designed to run for many years without requiring extensive repairs or thorough overhauling.

What is claimed is:

1. A high output square can seaming machine, comprising a stationary frame having a vertical post, a rotary frame positioned coaxially of said post, means for rotating said rotary frame, a plurality of seaming heads on said rotary frame, said seaming heads each comprising a plurality of primary arms pivotally mounted thereon, secondary arms pivotally mounted on said primary arms, and seaming rolls mounted on said secondary arms, a chuck associated with each seaming head mounted on said rotary frame, stationary with respect to said seaming heads, a guide associated with each seaming head having a guide-channel therein conforming to the shape of the can to be seamed, mounted on said rotary frame, stationary with respect to the seaming heads, a pin on said primary arm projecting into said guide-channel, cams in juxtaposition to the heels of each secondary arm, and means for actuating said cams to contact the heels of each secondary arm to press the seaming rolls thereon against the edges of the can-body and end to form a seam, comprising slide-rods on which said heel-contacting cams are mounted, a spider on which said slide-rods are mounted, a sleeve on which said spider is fastened, and a ring cam on said stationary frame for moving said sleeve, spider and slide-rods axially to bring said heel-contacting cams into and out of contact with the heels of said secondary arms carrying the seaming rolls, and means for rotating said seaming heads.

2. A high output square can seaming machine, according to claim 1, wherein said heel-contacting cams are swiveled to said slide-rods so that the cams can remain in steady and broad contact with said heels during the pivotal movements of said primary arms and the independent pivotal movements of said secondary arms.

3. A high output square can seaming machine comprising a stationary frame having a vertical post, a rotary frame positioned coaxially of said post, means for rotating said rotary frame, a plurality of seaming heads on said rotary frame, said seaming heads each comprising a plurality of primary arms pivotally mounted thereon, secondary arms pivotally mounted on said primary arms, and seaming rolls mounted on said secondary arms, a chuck associated with each seaming head mounted on said rotary frame, stationary with respect to said seaming heads, a guide associated with each seaming head having a guide-channel therein conforming to the shape of the can to be seamed, mounted on said rotary frame, stationary with respect to the seaming heads, a pin on said primary arm projecting into said guide-channel, cams in juxtaposition to the heels of each secondary arm, and means for rotating said seaming heads, said seaming heads each comprising a post fixed to said rotary frame to which said chuck and guide are fastened, a sleeve coaxial with said post which is rotated by said means for rotating the seaming heads, said coaxial sleeve having bearings in which said primary arms are pivotally mounted, a second sleeve coaxial with said first named sleeve, rotatable therewith and slidable axially thereon, said second sleeve having a spider fastened thereto, slide-rods connected to said spider, each having a heel-contacting cam thereon, and a ring cam on said stationary frame contacting a part of said second sleeve to impart axial movement to said slide rods and the cams carried thereby, to bring said heel contacting cams into and out of contact with the heels of said secondary arms carrying said seaming rolls.

4. A high output square can seaming machine, according to claim 1 wherein said ring cam on said fixed frame is above the seaming heads, wherein the seaming heads are close to said vertical post and wherein said slide rods and spider carrying sleeve extend upwardly from said seaming head.

PETER KRUSE.

REFERENCES CITED

The following references are of record in the file of this patent:

UNITED STATES PATENTS

| Number | Name | Date |
|---|---|---|
| 805,736 | Lindgren | Nov. 28, 1905 |
| 818,806 | Adriance | Apr. 24, 1906 |
| 1,040,951 | Johnson | Oct. 8, 1912 |
| 1,486,151 | McIntyre | Mar. 11, 1924 |
| 1,929,339 | Troyer | Oct. 3, 1933 |
| 1,972,878 | Erb | Sept. 11, 1934 |
| 2,312,102 | Krueger | Feb. 23, 1943 |
| 2,345,870 | Guenther | Apr. 4, 1944 |
| 2,362,848 | Pearson | Nov. 14, 1944 |
| 2,382,469 | Diezel | Aug. 14, 1945 |
| 2,432,815 | Schmitt | Dec. 16, 1947 |

FOREIGN PATENTS

| Number | Country | Date |
|---|---|---|
| 20,944 | Great Britain | 1907 |
| 24,448 | Great Britain | 1908 |